May 10, 1938. D. POINTER Re. 20,721

VALVE STEM CLEARANCE JIG

Original Filed Oct. 8, 1936 2 Sheets-Sheet 1

Delbert Pointer, INVENTOR

BY Victor J. Evans & Co.

ATTORNEYS

WITNESS P. J. Kirby

May 10, 1938. D. POINTER Re. 20,721

VALVE STEM CLEARANCE JIG

Original Filed Oct. 8, 1936 2 Sheets-Sheet 2

Delbert Pointer,
INVENTOR

BY Victor J. Evans & Co.
ATTORNEYS

P. J. Hickey
WITNESS

Reissued May 10, 1938

Re. 20,721

UNITED STATES PATENT OFFICE 20,721

VALVE STEM CLEARANCE JIG

Delbert Pointer, Farmer City, Ill.

Original No. 2,105,502, dated January 18, 1938, Serial No. 104,737, October 8, 1936. Application for reissue March 2, 1938, Serial No. 193,608

5 Claims. (Cl. 33—147)

This invention relates to a valve stem clearance jig and has for the primary object the provision of a portable and inexpensive device of this character which will materially aid in accurately grinding valves of an engine to fit the valve mechanism adjustment of said engine with proper clearance, eliminating the necessity of adjusting the valve mechanism of the engine after the valve grinding operation and is easily adjusted to the valve mechanism adjustments of different engines.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating a valve stem clearance jig constructed in accordance with my invention.

Figure 1:
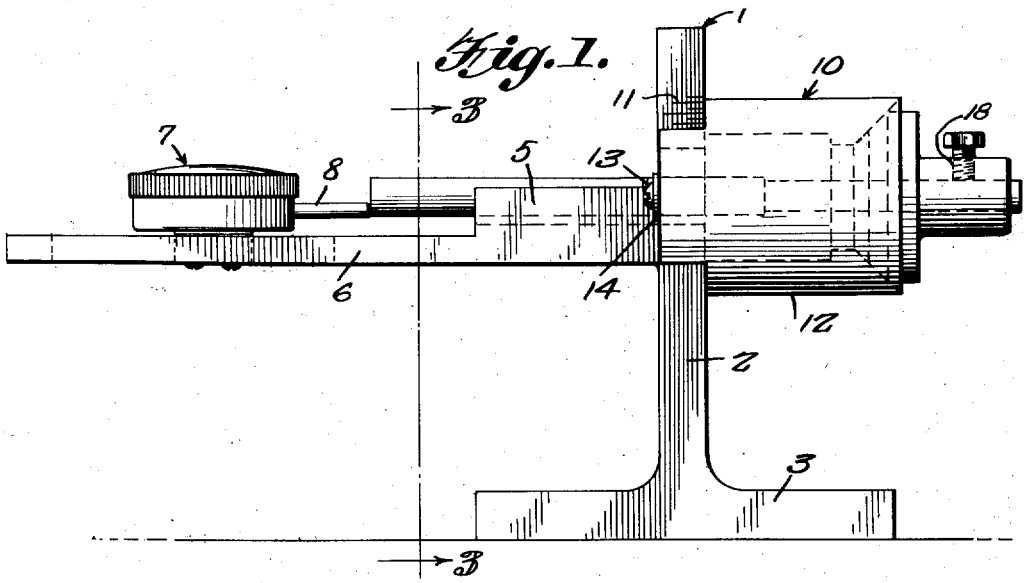
Figure 2:
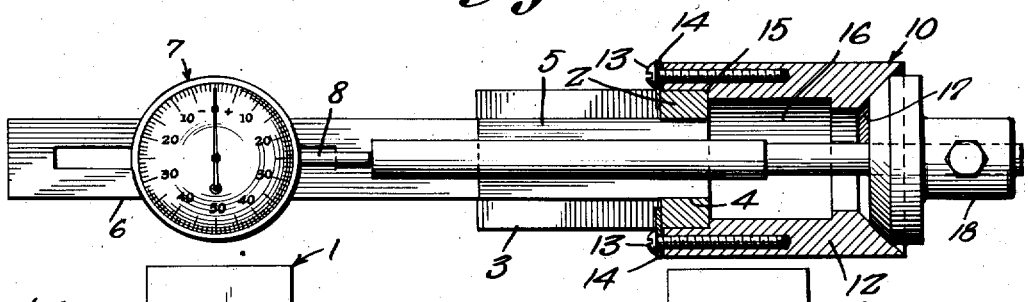
Figure 2 is a top plan view partly in section illustrating the same.
Figure 3:
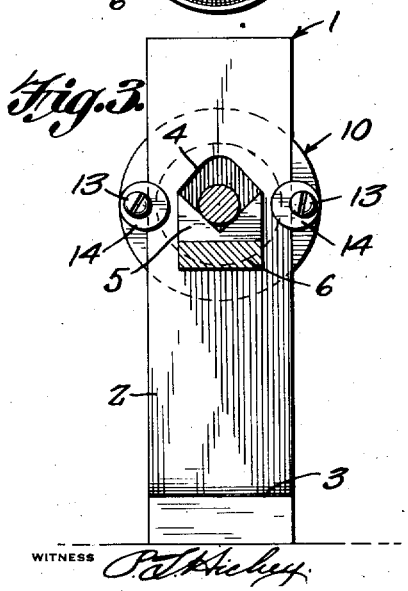
Figure 3 is a transverse sectional view taken on the line 3—3 of Figure 1.
Figure 4:
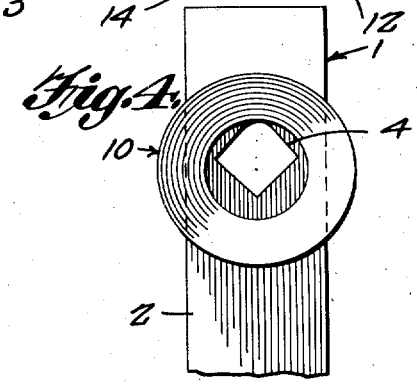
Figure 4 is a fragmentary end view illustrating the jig.

Referring in detail to the drawings, the numeral 1 indicates in its entirety a jig consisting of a vertically arranged post 2 supported by a base 3. The post has an opening 4 and aligning with said opening and forming an integral part of the post and arranged horizontally is a seat 5 of substantially V shape in cross section. The seat 5 has an extension 6 integral therewith to form a support for a gage 7 of a conventional construction including the usual actuating plunger 8. The gage 7 is of the rim set type so that the dial can be adjusted relative to the indicating hand of the gage. The gage is adjustable endwise of the extension 6 and towards and from the seat 5 and is easily secured in its adjusted positions by set screws 9.

Figure 5:
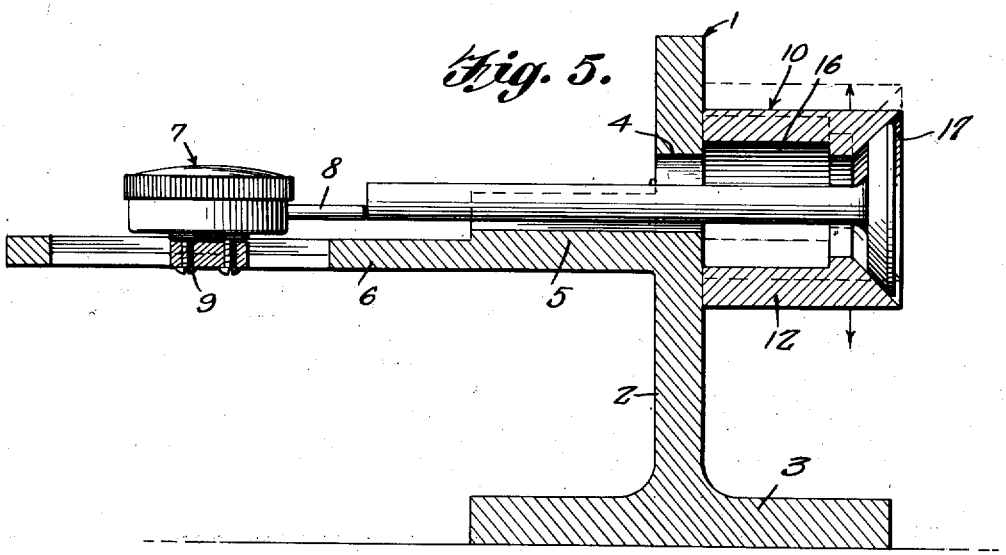
Figure 5 is a vertical sectional view showing a valve adapted to the jig.
Figure 6:
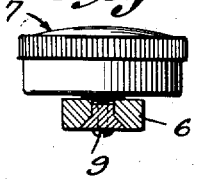
Figure 6 is a detail sectional view showing the means of adjustably mounting the gage on the jig.
Figure 7:
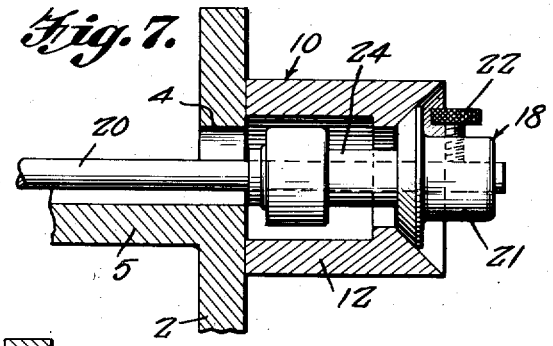
Figure 7 is a fragmentary sectional view showing a gage setting tool associated with the jig head.
Figure 8:
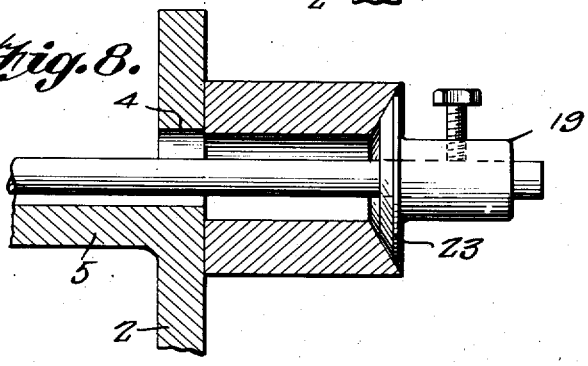
Figure 8 is a fragmentary vertical sectional view illustrating another type of gage setting tool associated with the jig head.

A jig head 10 is slidably mounted on the post 2 and is arranged on an opposite side of the post from the seat 5 and is capable of adjustment upwardly and downwardly on the post, the latter having a suitable scale 11 to facilitate the adjustment of the head with respect to the seat 5. The head 10 consists of a cylindrical body 12 slidably and adjustably secured to the post 2 by set bolts 13 threaded in the body and equipped with collars 14 engaging the post. The body 12 is grooved, as shown at 15, to receive the post and cooperate with the collars in slidably connecting the body to the post. The body has a bore 16 therethrough and one end of the body is shaped to form a seat 17. The seat is shaped in accordance with the shape of a valve seat of an engine. In order that this jig may be employed with different engines it will be necessary to have heads with the seats thereof in accordance with the valve seats of the different engines so that when using the jig the proper head for a particular engine will be adapted to the post 2. The seat 17 of the head is in communication with the bore 16 and the latter with the opening in the post and as the head is adjustable on the post the seat 17 may be readily centered with respect to the seat 5 so that when a valve of an engine is adapted or placed in the jig the head of the valve will engage the seat 17 evenly with the stem of the valve supported by the seat 5, as shown in Figure 5. The head of the valve when in engagement with the seat 17 contacts the plunger 8 of the gage to move the indicator hand of the gage with respect to the scale or dial readings.

In order to adjust the jig described for grinding a valve stem of a valve of an engine to have the proper clearance, a gage setting tool is employed. This tool is now in use and forms no part of the present invention. There are several forms of gage setting tools in order that such tools may be used on the different types of engines now in use. In order to illustrate a gage setting tool I have elected to show two forms, one indicated by the character 18 and the other by the character 19. Each of these forms of gage setting tools consists of a stem 20 and a head 21 slidable on the stem and held in various adjusted positions by a set bolt 22. The head in both forms has a portion shaped in accordance with a valve head, as shown at 23. The form of gage setting tool indicated by the character 18 has an extension 24 integral with the head 21 and of a diameter equal to the exterior diameter of a valve guide of an engine. In order to remove certain types of valves from engines it is necessary to remove the valve guide and when using a gage setting tool on the engine with the valve guide removed, the form indicated by the character 18 is employed so that the extension 24 will fit against the walls of the cylinder block which engage with the valve guide so that when the gage setting tool is placed in engagement with the valve seat of the engine and the stem 20 engaging with the valve lifter of the engine the gage setting tool will be held against accidental movement.

For the type of valve which can be removed from an engine without removal of the valve guide, the gage setting tool 19 is employed for obtaining the exact distance between the valve seat of the engine and the valve lifter. This is accomplished by bringing the stem 20 in engagement with the valve lifter and adjusting the head of the gage setting tool against the valve seat. The head of the gage setting tool is then locked to the stem 20 by the set bolt 22. The gage setting tool is then removed from the engine and placed in the jig with the head thereof in engagement with the seat 17 and the stem 20 in engagement with the plunger 8 causing actuation of the gage. The dial of the gage is then set to a zero reading and the gage setting tool then removed from the jig. With the jig thus set or in accordance with the distance between the valve seat and the valve lifter of a particular engine, the valves of said engine after being ground will have their proper clearance destroyed due to the grinding operation. In order that the valve stem of the valve be ground to a length to have proper clearance when the valve is assembled in the engine, said valve is positioned in the jig with the head of the valve against the seat 17 and the stem of the valve against the plunger 8 actuating the gage so that the operator may determine exactly the length which the valve stem must be in order to have the proper valve clearance for the engine. The operator then proceeds to grind off the valve stem until said stem is the proper length to provide for the necessary valve clearance. During the grinding of the stem of the valve the operator can at any time by placing the valve in the jig ascertain how much more of the stem should be removed in order to make the stem of the proper length.

Having described the invention, I claim:

1. A valve stem clearance jig comprising a vertically arranged post having an opening, a horizontally disposed valve stem rest carried by said post, means for supporting a gage on said rest, and a jig head slidably supported on the post including a body having a bore and a seat to be engaged by a valve head with the stem supported by the rest and in engagement with the gage.

2. A valve stem clearance jig comprising a base, a post carried by said base and having an opening, a valve stem rest carried by the post, an extension carried by the rest for adjustably supporting a gage relative to the rest, a jig head adjustably mounted on the post and including a body having a bore, and a seat capable of being centered with respect to the rest by the adjustment of the head on the post.

3. A valve stem clearance jig comprising a jig head having a bore and a seat at one end of the bore to receive a valve with the valve stem passing through and coincident with the axis of the bore, a valve stem rest for lateral reception of the valve stem, a gage remote from the jig head for engagement with the end of the valve stem, and a common supporting means for the jig head, stem rest and gage on which the jig head and rest are relatively adjustable so that the rest may receive and support throughout its length stems of varying diameters when the connected valve is engaged with the seat.

4. A valve stem clearance jig comprising a jig head having a bore and a seat at one end of the bore to receive a valve with the valve stem passing through and coincident with the axis of the bore, a valve stem rest for lateral reception of the valve stem and disposed in a plane parallel to the axis of the jig head, a gage remote from the jig head for engagement with the end of the valve stem, and adjustable means for varying the spacing of the planes of the stem rest and axis of the jig head.

5. A valve stem clearance jig comprising a support, a horizontally disposed valve stem rest carried by said support, a gage carried by said support, a jig head having a bore and a seat to be engaged by a valve with the stem thereof extending through the bore, in lateral contact with the rest and in engagement with the gage, and means for effecting relative adjustment of the jig head and rest to vary the spacing between the latter and the axis of the jig head.

DELBERT POINTER.